United States Patent [19]
Lively

[11] Patent Number: 5,570,918
[45] Date of Patent: Nov. 5, 1996

[54] UNIVERSAL BUMPER SYSTEM

[76] Inventor: Thomas J. Lively, 676 20th Ave., Yuma, Ariz. 85364

[21] Appl. No.: 395,328

[22] Filed: Feb. 28, 1995

[51] Int. Cl.⁶ ................................................ B60R 19/02
[52] U.S. Cl. ........................... 293/132; 293/136; 293/137
[58] Field of Search .................................. 293/132, 135, 293/136, 137, 155

[56] References Cited

U.S. PATENT DOCUMENTS

| | | |
|---|---|---|
| D. 330,880 | 11/1992 | Lively . |
| 3,752,462 | 8/1973 | Wight, Jr. ............................. 293/136 X |
| 4,066,286 | 1/1978 | Haberle et al. ........................ 293/136 |
| 4,079,924 | 3/1978 | Persicke ............................... 293/137 X |
| 4,200,318 | 4/1980 | Gute et al. ............................ 293/136 |
| 4,262,778 | 4/1981 | Flusin ................................... 293/134 X |
| 4,624,493 | 11/1986 | Hillebrand et al. ..................... 293/136 |

*Primary Examiner*—Joseph D. Pape
*Attorney, Agent, or Firm*—Chase & Yakimo

[57] ABSTRACT

A universal bumper system presents first and second shock assemblies attached to a vehicle frame. Each assembly comprises a mounting plate with a housing mounted thereto, the housing receiving a shaft in slidable, reciprocal movement therethrough. At a forward end of the shaft are first and second seats with a compressible sleeve therebetween. At the front end of each slide rod is a mounting bracket for pivotal mounting of a universal bumper bracket with bumper thereto. The independent shock assemblies and bumper pivotally mounted thereto absorb forces from various angles and return the bumper to its original position relative to the vehicle.

12 Claims, 7 Drawing Sheets

5,570,918

UNIVERSAL BUMPER SYSTEM

BACKGROUND OF THE INVENTION

This invention relates to a universal bumper system and, more particularly, to a self-aligning bumper system having a pair of independent shock assemblies which effectively absorb impact forces from various angles.

Various types of shock absorption systems for vehicle bumpers have been proposed. Such systems are designed to prevent the transmission of damaging impact forces to the vehicle components. Past systems are said to decrease the damage to the vehicle and possible personal injury to the vehicle occupants. However, such devices were generally complex in construction which decreased their acceptability and use in the marketplace. Moreover, such devices did not effectively absorb impact forces so as to restore the impacted bumper to its normal position. Accordingly, it is desirable to have a bumper system which can effectively dampen impact forces as delivered from various angles and restore the bumper to a normal position.

In response thereto I have invented a novel bumper system for use on various vehicle types, e.g., utility or recreational vehicles. The system includes a pair of shock assemblies which are pivotally mounted to the bumper by means of universal mounting brackets. Upon impact the bumper responds to the direction of impact so as to transfer the forces to the shock assembly according to the location of the impact of the bumper. The pivotal mounting brackets align the bumper in a normal position relative to the vehicle frame.

It is therefore a general object of this invention to provide a universal bumper system having a shock absorption capability.

Another object of this invention is to provide a bumper system, as aforesaid, which has a pair of shock assemblies mounted to the vehicle frame and pivotally mounted to the bumper.

A further object of this invention is to provide a bumper system, as aforesaid, which can effectively resist impact forces from various angles.

A further particular object of this invention is to provide a bumper system, as aforesaid, which is easily adaptable for use on various vehicle types and adaptable for use in other environments.

Still another particular object of this invention is to provide a bumper system, as aforesaid, which aligns the bumper in a normal position relative to the vehicle.

Another particular object of this invention is to provide a bumper system, as aforesaid, which is easily installed to the vehicle frame and easily maintained.

A still more particular object of this invention is to provide a bumper system, as aforesaid, which utilizes a replaceable, compressible member to dampen bumper impact forces delivered thereto.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
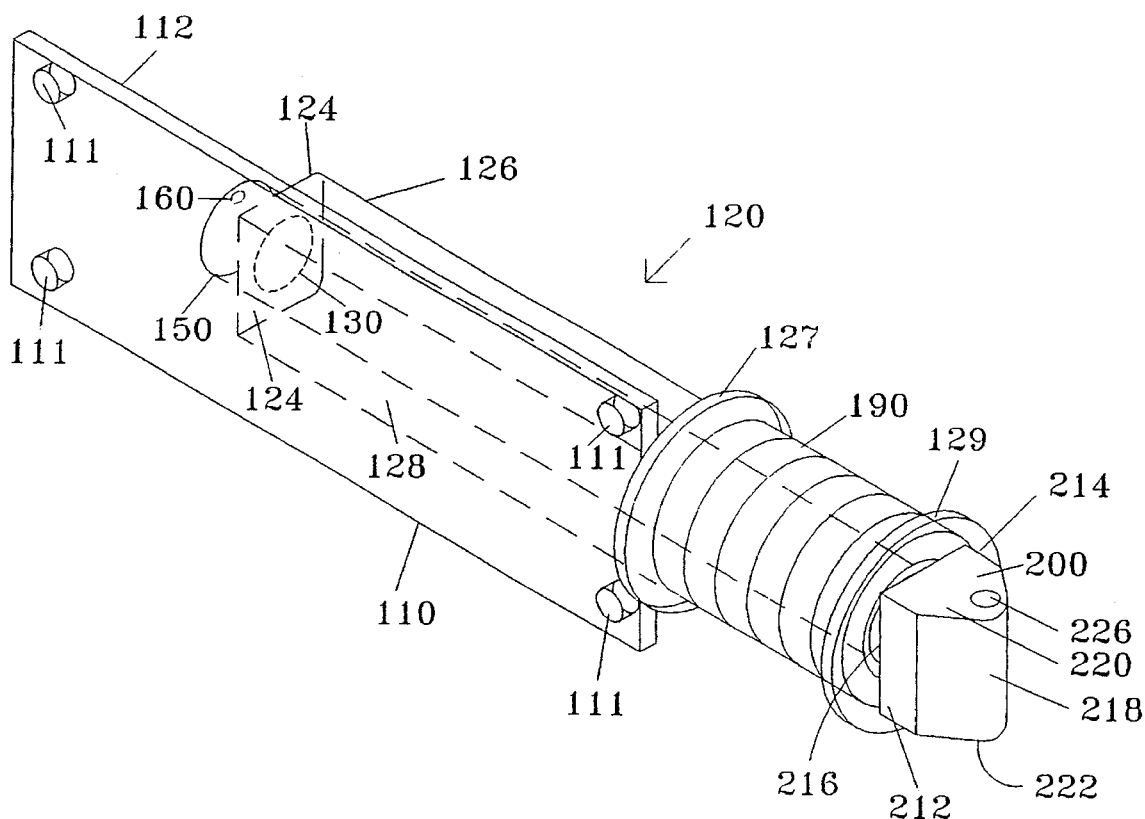
FIG. 1 is a perspective view showing one of two shock assemblies of the vehicle bumper system.
Figure 2:
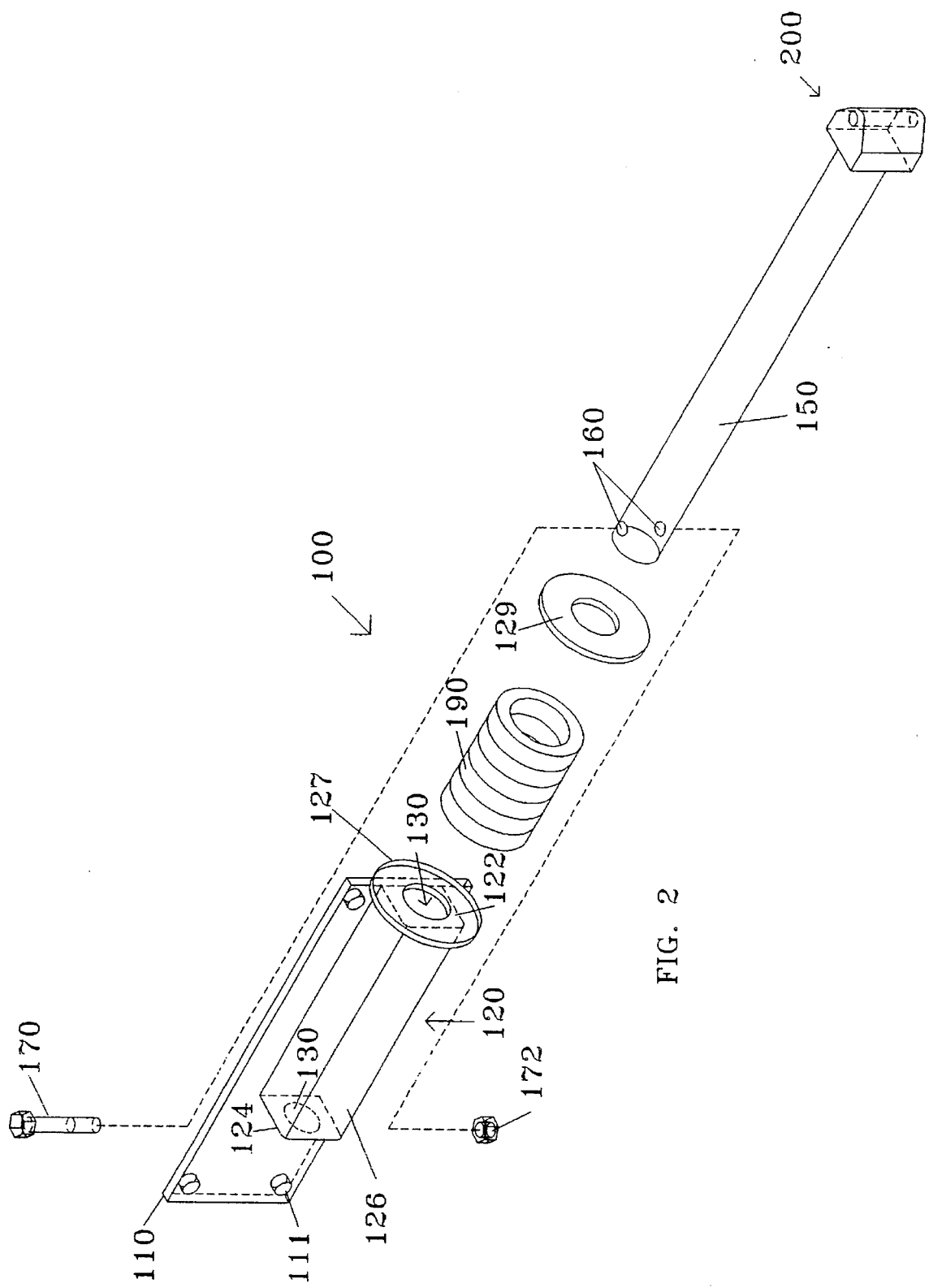
FIG. 2 is an exploded perspective view of the other shock assembly, on a reduced scale, of the vehicle bumper system.
Figure 3:
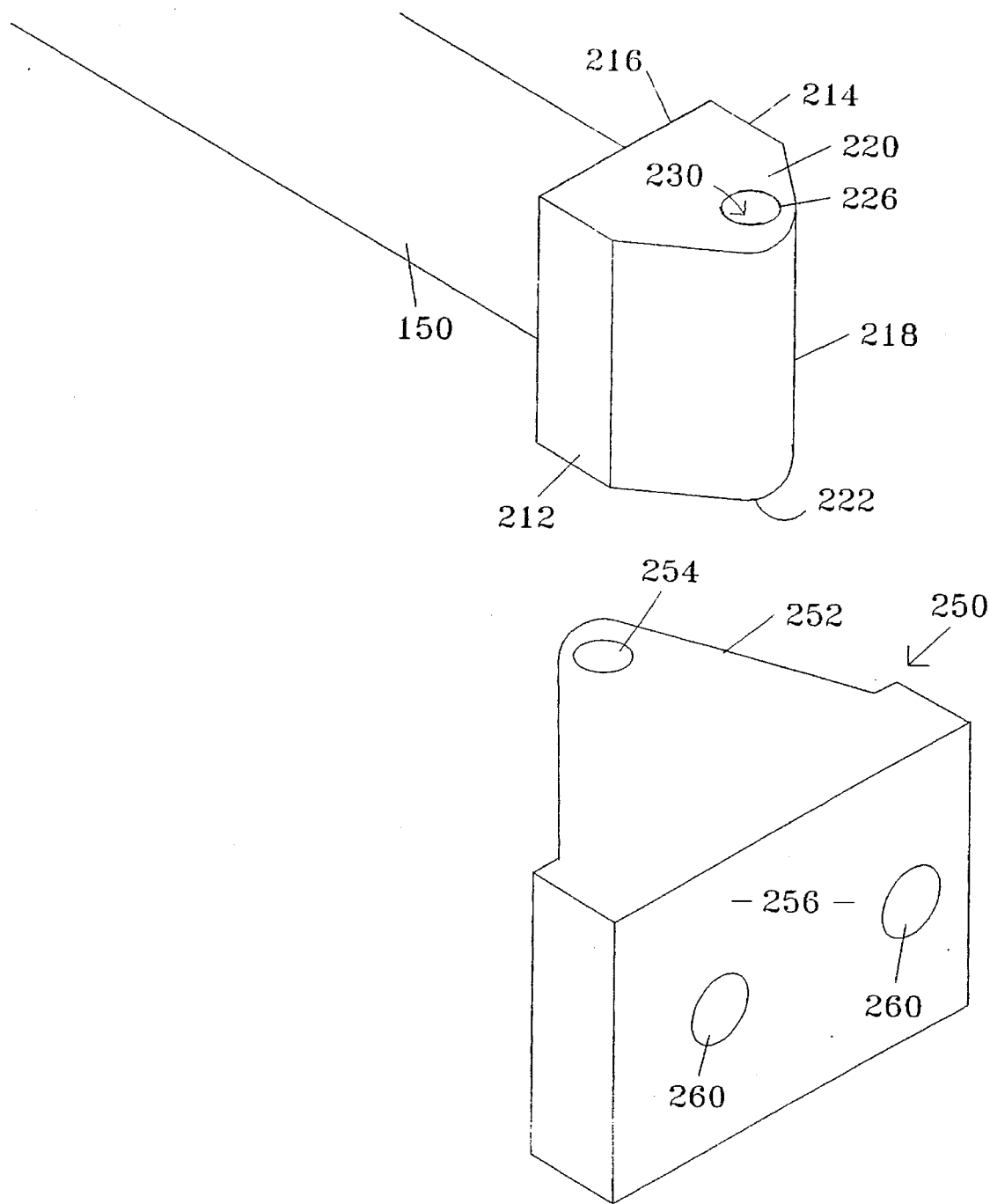
FIG. 3 is a fragmentary view, on an enlarged scale, of the front end of the slidable rod of one shock assembly and a bumper mounting bracket exploded therefrom.
Figure 4:
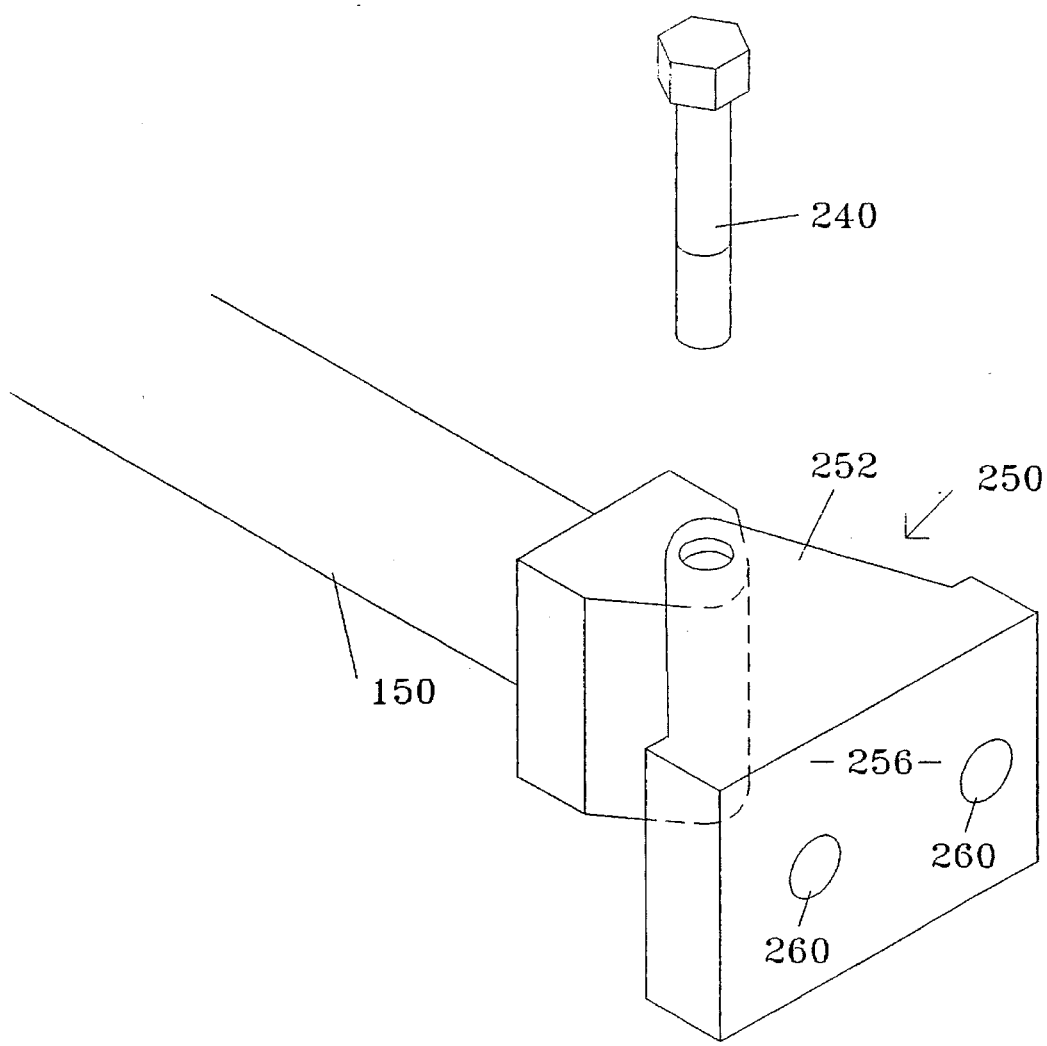
FIG. 4 is a view as in FIG. 3 showing the bumper mounting bracket positioned at the front end of the slidable rod with a bolt/nut fastener exploded therefrom.
Figure 5:
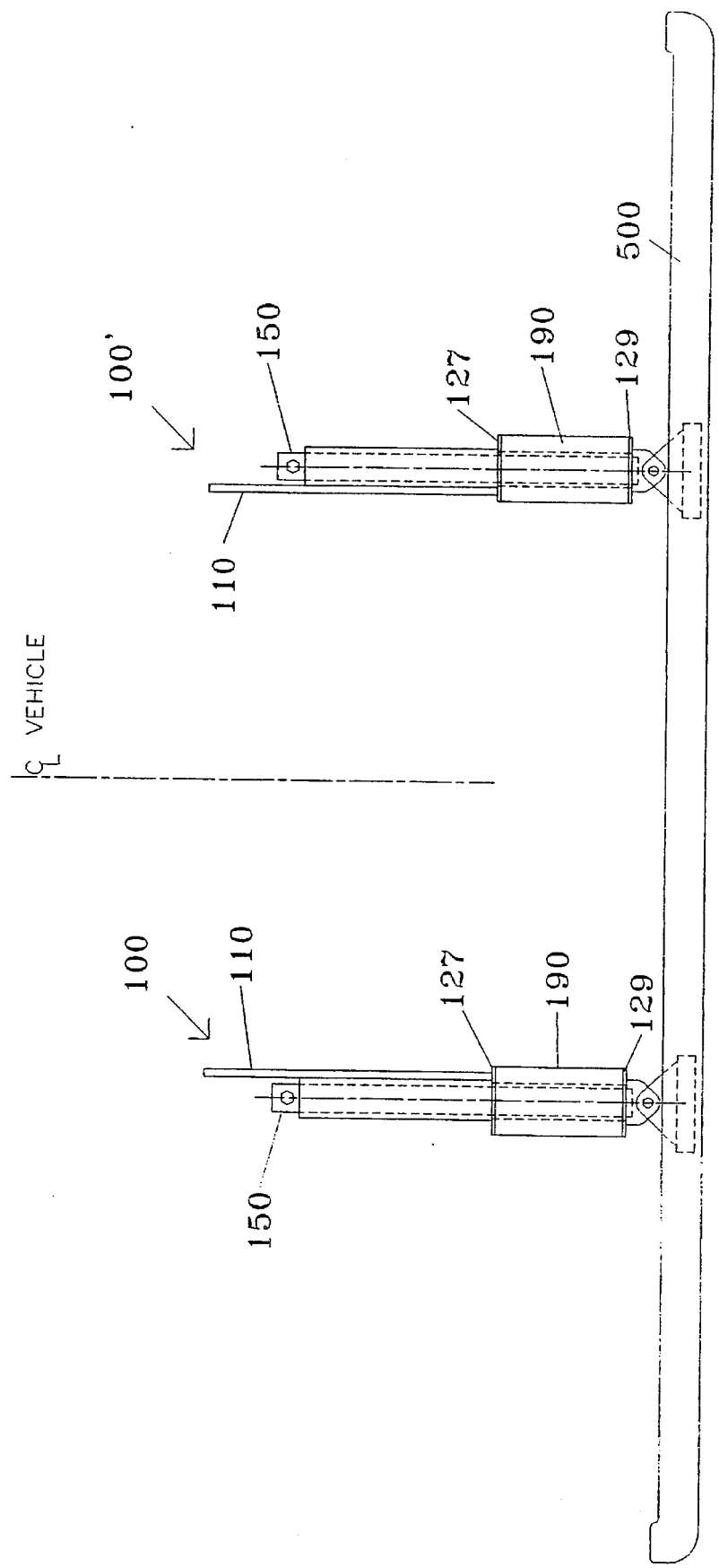
FIG. 5 is a top view of the universal bumper system diagrammatically showing the first and second shock assemblies extending therebetween.
Figure 6:
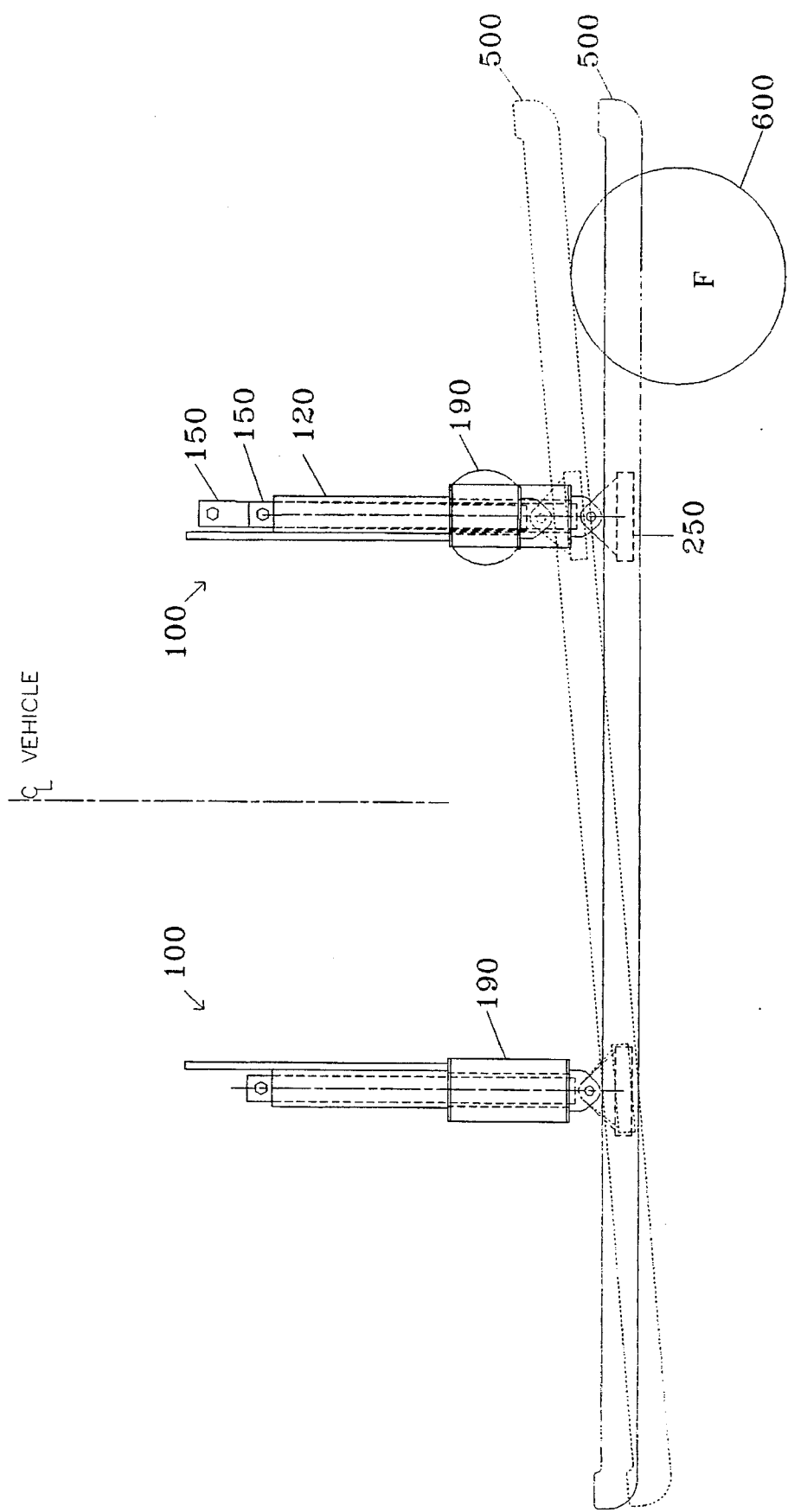
FIG. 6 is a top view of the system of FIG. 5 showing a normal position and a position of the shock assemblies upon impact of a force on one side of the bumper.
Figure 7:
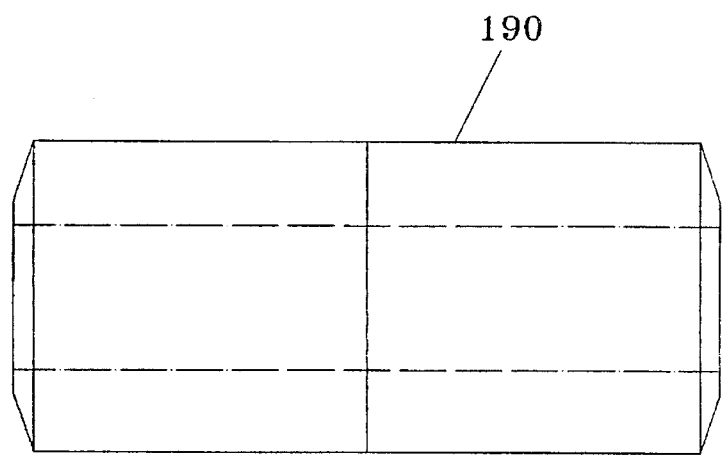
FIG. 7 is a side view of the compressible sleeve element positioned about the slidable rod.
Figure 8:
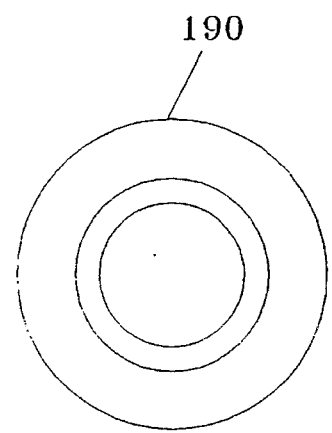
FIG. 8 is a front view of the sleeve element in FIG. 7.

Turning more particularly to the drawings, FIG. 1 illustrates one shock absorption assembly 100 as having a mounting plate 110 with mounting apertures 111 for attachment to a vehicle frame. Attached to the inside surface 112 of mounting plate 110 is a housing 120 having front 122 and rear 124 walls and side walls 126, 128. Apertures 130 are located in the front 122 and rear 124 walls of housing 120. A second identical shock assembly 100 is laterally spaced from the first shock assembly 100 and likewise attached to the vehicle frame so as to present laterally spaced-apart shock assemblies with a portion of the vehicle bumper 500 extending therebetween. It is understood that the assemblies 100 may have other relationships such that housings 120 are on the medial side of the plates 110 rather than the lateral sides as shown in FIGS. 5, 6 of the drawings.

Extending through the housing 120 is a tubular rod 150 having a pair of apertures 160 at the rear end thereof. The apertured 160 end of rod 150 extends beyond the rear wall 124 of housing 120 and receives a bolt 170/nut 172 combination extending therethrough. This bolt/nut combination cooperates with the rear wall 124 of the housing so as to preclude forward movement of the rod 150 rear end into the confines of the housing 120.

Adjacent the front wall 126 of housing 120 is a circular flange 127 which serves as a seat for one end of a compressible sleeve-like dampener 190 which encompasses the rod 150. I currently intend to use a rubber isolator available from Firestone Industrial Products of Carmel, Indiana identified as stock part No. W22-3658-0251. Further adjacent the opposed end of the isolator 190 is a second seat 129 which is attached about rod 150. Seat 129 is adjacent the first bracket 200 found at the forward end of rod 150.

This first mounting bracket 200 comprises a pair of side walls 212, 214 rear wall 216, a rounded front wall 218 and top 220 and bottom 222 walls. Top 220 and bottom 222 walls have apertures 226 with a connecting bore 230. Pivotally attached to the bracket 210 is a universal bumper mounting bracket 250 by means of a pin 240 extending through an aperture 254 in the top wall 252 of brackets 252 and through the bore 230. Bolts (not shown) extending through the apertures 260 in the front wall 256 of bumper mounting bracket 250 attach the vehicle bumper 500 to bracket 250.

As shown in FIG. 6, a force is being exerted by 600 on one end of the bumper 500. Accordingly, the nearest bumper bracket 250 will swivel about pin 240. Concurrently, the tubular rod 150 slides through the housing 120 such that seat 129 approaches seat 127. The rearward travel of rod 150 is resisted by compression of the intermediate sleeve 190. Accordingly, the forces exerted on the bumper 500 are transmitted through this slide rod 150 and are dampened by the isolator 190, the isolator 190 dampening/absorbing the forces acting on rod 150. During such slidable longitudinal movement of the rod 150 the bracket 250 pivots around the pivot pin 240. Upon a reverse, slidable, forward movement of the rod 250, the pivotal movement of the bracket 250 will likewise reverse so as to self align the bumper 500 once the impact forces are removed. Thus, the rod 150 will return the bumper 500 to its original position.

Accordingly, I have found that the above independent support assemblies 100 effectively absorb shock from various angles on the bumper 500. Furthermore, the individual shock assemblies 100 can be effectively serviced as the slide rod 150 is easily removable from the respective housing 120 by removal of the pin 170/nut 172 combination. Also, the intermediate sleeves 190 may be removed and replaced, such replacements not being limited to the same type of isolators 190. Accordingly, the original isolator may be replaced with isolators or other bias type devices of various compressible strength according to the situation at hand.

It is understood that the assembly may be used to dampen forces acting on other members such as the end of a loading dock with one end of the mounting plate attached to a support and the other end attached to the member. It is also to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A system for attaching a bumper to a vehicle frame comprising:
    a pair of shock assemblies, each assembly comprising:
        a mounting plate for attachment to a vehicle frame;
        a housing attached to said mounting plate, said housing comprising at least longitudinally spaced-apart front and rear walls;
        an aperture in each of said front and rear walls;
        an elongated rod having front and rear ends, said rod extending through said apertures for reciprocal, slidable movement relative to said housing;
        means at said rear end of said rod for precluding movement of said rod rear end into said housing;
        a first seat at said front wall of said housing and encompassing a portion of said front end of said rod extending from said front wall of said housing;
        a compressible element encompassing said rod, said element having first and second ends with said first end positioned in said first seat;
        a second seat at said front end of said rod, said second seat receiving said second compressible element end therein;
        a first bracket at said front end of said rod;
        a second bracket;
        means for pivotally mounting said second bracket to said first bracket;
        means for mounting a vehicle bumper to said second bracket at a normal position relative to a vehicle frame, whereupon an external force exerted on the bumper sufficient to displace the bumper from said normal position slides at least one rod through said housing wherein said second seat approaches said first seat and compresses said element therebetween, said compressed element biasing said at least one rod and said second seat attached thereto away from said first seat, whereby to bias the vehicle bumper towards said normal position.

2. The system as claimed in claim 1 wherein said housing further comprises at least one side wall extending between said housing front and rear walls, said at least one side wall attached to said mounting plate.

3. The system as claimed in claim 1 wherein said movement precluding means comprises:
    at least one aperture in said rear end of said rod;
    a pin in said aperture and extending from said rod, said pin contacting said rear wall of said housing during movement of said rod in a direction moving said second seat away from said first seat.

4. The system as claimed in claim 1 wherein said compressible element comprises a rubber isolator.

5. The system as claimed in claim 1 wherein said first bracket comprises:
    a vertical wall attached to said front end of said rod;
    at least a horizontal wall forwardly extending from a top edge of said vertical wall, said second bracket mounting means mounting said second bracket to said horizontal wall.

6. The system as claimed in claim 5 wherein said second bracket pivot mounting means comprises:
    a first aperture in said horizontal wall of said first bracket;
    a second aperture in said second bracket for alignment with said first aperture in said first bracket;
    a pin extending through said aligned first and second apertures.

7. The system as claimed in claim 6 wherein said second bracket comprises:
    a front wall;
    at least one aperture in said front wall for extension of a bolt thereto, said bolt connected to a vehicle bumper;
    a horizontal wall rearwardly extending from said front wall, said second bracket aperture in said horizontal wall.

8. A system for attaching a bumper to a vehicle frame comprising:
    a pair of shock assemblies, each assembly comprising:
        a housing for attachment to a vehicle frame;
        an elongated rod having front and rear ends;
        means for releasably mounting said rod in reciprocal, slidable movement through said housing with said front and rear rod ends extending beyond said housing;
        a first seat at a front end of said housing and encompassing a portion of said front end of said rod;
        a compressible element encompassing said rod extending beyond said first seat, said element having first and second ends with said first end positioned in said first seat;
        a second seat at the front end of said rod, said second seat receiving said second compressible element end therein; a bracket assembly at said front end of said rod and forward of said second seat for attachment to a vehicle bumper;
        means for pivotally mounting said bracket assembly relative to said front end of said rod;
        means for mounting a vehicle bumper to said bracket assembly at a normal position relative to a vehicle, whereupon an external force exerted on the bumper sufficient to displace the bumper from said normal position slides at least one rod and second seat thereon towards said first seat for compression of said element therebetween, said compressed element biasing said at least one rod and said second seat away from said first seat, whereby to bias the vehicle bumper towards a normal position.

9. The system as claimed in claim 8 wherein said rod mounting means comprises:

a first aperture in a rear wall of said housing;

a second aperture in a front wall of said housing and in longitudinal alignment with said first aperture, said apertures supporting said rod extending therethrough; and means at said rear end of said rod for precluding slidable movement of said rod rear end through said first housing aperture and into said housing.

10. The system as claimed in claim 8 wherein said bracket assembly comprises:

a first bracket having a first wall connected to said front end of said rod;

a second wall extending from said first wall of said first bracket;

a second bracket having a first wall for connection to a vehicle bumper;

a second wall extending from said first bracket wall and adapted to lie adjacent said second wall of said first bracket; and means for connecting said second walls of said first and second brackets in relative movement about a common imaginary axis extending through said second walls, said connecting means providing for said pivotal movement of said bracket assembly relative to said front end of said rod.

11. The system as claimed in claim 10 wherein said second walls of said first and second brackets horizontally extends from said respective first walls of each bracket wherein said connecting means comprises:

an aperture in each horizontal wall for alignment therebetween;

a pin extending through said aligned apertures, said pin providing a pivot axis for movement of each second wall therearound.

12. A system for dampening forces acting on a member comprising:

at least one shock assembly comprising:

a mounting plate having a first end for attachment to a support displaced from said member;

a housing attached to said mounting plate, said housing comprising at least longitudinally spaced-apart front and rear walls;

an aperture in each of said front and rear walls;

an elongated rod having front and rear ends, said rod extending through said apertures for reciprocal, slidable movement relative to said housing;

means at said rear end of said rod for precluding movement of said rod rear end into said housing;

a first seat at said front wall of said housing and encompassing a portion of said front end of said rod extending from said front wall of said housing;

a compressible element encompassing said rod, said element having first and second ends with said first end positioned in said first seat;

a second seat at said front end of said rod, said second seat receiving said second compressible element end therein;

a first bracket at said front end of said rod;

a second bracket;

means for pivotally mounting said second bracket to said first bracket;

means for mounting said member to said second bracket whereupon an external force exerted on the member slides at least one rod through said housing wherein said second seat approaches said first seat and compresses said element therebetween, said compressed element biasing said at least one rod and said second seat attached thereto away from said first seat, whereby to bias the member towards a normal position.

* * * * *